March 19, 1935.  O. B. MUELLER ET AL  1,995,006
PIPE JOINT
Filed Aug. 2, 1933    3 Sheets-Sheet 1

Oscar B. Mueller,
Harold K. Rader,
Wilfred H. Proctor,
Philip Irving,
  Inventors,
Delos F. Haynes,
  Attorney March 19, 1935.   O. B. MUELLER ET AL   1,995,006
PIPE JOINT
Filed Aug. 2, 1933   3 Sheets-Sheet 2

Oscar B. Mueller,
Harold K. Rader,
Wilfred H. Procter,
Philip Irving,
Inventors
Delos G. Haynes,
Attorney March 19, 1935.   O. B. MUELLER ET AL   1,995,006
PIPE JOINT
Filed Aug. 2, 1933   3 Sheets-Sheet 3

Oscar B. Mueller,
Harold K. Rader,
Wilfred H. Proctor,
Philip Irving,
Inventors,
Delos G. Haynes,
Attorney.

Patented Mar. 19, 1935

1,995,006

UNITED STATES PATENT OFFICE 1,995,006

PIPE JOINT

Oscar B. Mueller, Harold K. Rader, Wilfred H. Proctor, and Philip L. Irving, Port Huron, Mich., assignors to Mueller Brass Co., Port Huron, Mich., a corporation of Michigan Application August 2, 1933, Serial No. 683,280

9 Claims. (Cl. 285—117)

This invention relates to pipe joints, and with regard to certain more specific features, to pipe joints of a permanent, non-separable nature.

Among the several objects of the invention may be noted the provision of a pipe joint which, when once assembled, it is substantially impossible to separate; a pipe joint of exceptional mechanical strength against internal pressure and like strains; a pipe joint which is tightly sealed against egress or leakage of fluid being carried by the pipe; and the provision of a pipe joint of the class described which is relatively simple in construction and may be assembled with facility. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation, partially in section, of a joint embodying the present invention;

Figure 3:
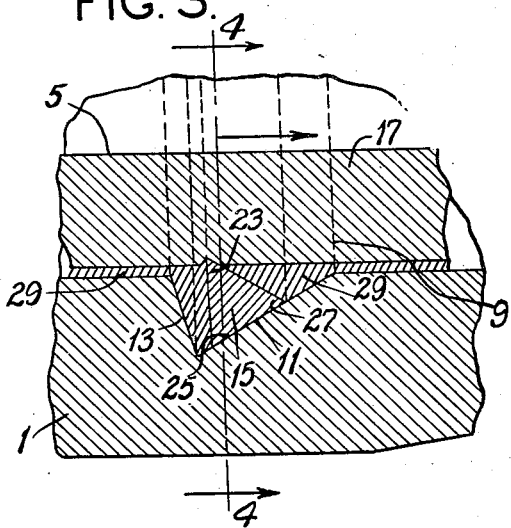
Fig. 3 is an enlarged section similar to Fig. 2, showing the elements in position after assembly has been completed.
Figure 4:
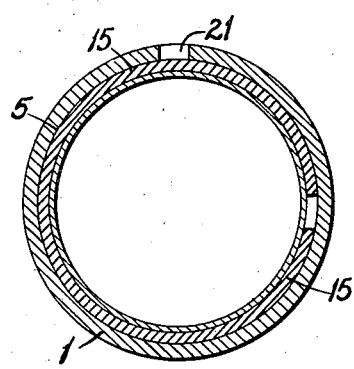
Fig. 4 is a cross section taken on lines 4—4 of Figures 1 and 3.
Figure 9:
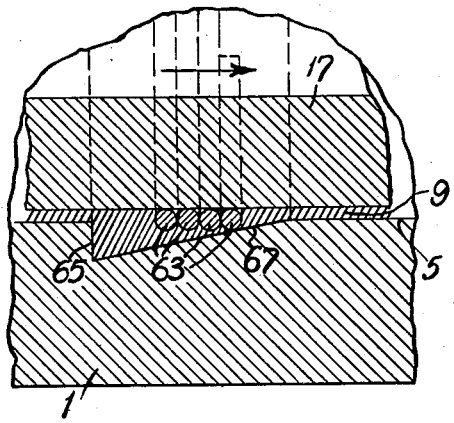
Figure 10:
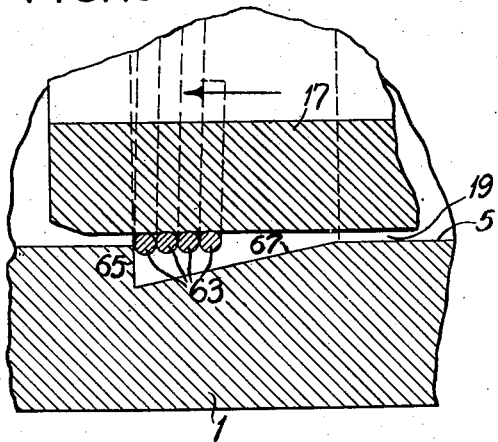
Figure 11:
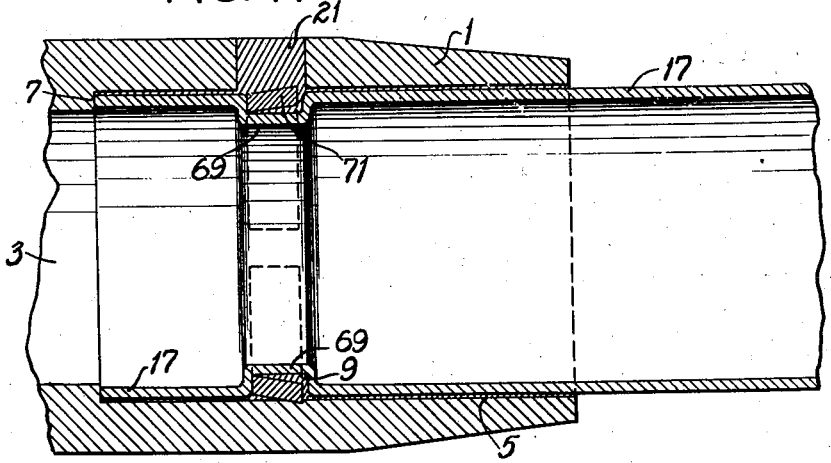
Figure 12:
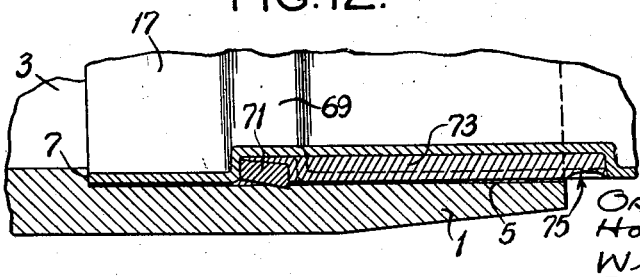

Figures 5, 6, 7, 8, and 9 are enlarged sections similar to Fig. 3, showing alternative embodiments of the invention;

Fig. 10 is an enlarged section of the joint shown in Fig. 9, but in the course of assembly;

Fig. 11 is an axial section of a joint embodying a modified form of the invention; and, Fig. 12 is a fragmentary section similar to Fig. 11, illustrating a modification of the Fig. 11 form of the invention.

Similar reference characters indicate corresponding parts throughout the several views of the drawings.

The present invention is in the nature of an improvement over the type of pipe joint shown in Charles A. Hill Patent Number 1,770,852, granted July 15, 1930, although it is susceptible of use independently of the type of joint illustrated in said Hill patent. The Hill patent shows a type of joint which is quite satisfactory under normal uses, such as plumbing installations and the like. However, since the joining is effected in the Hill patent by means of a capillary film of solder or like sealing material, this type of joint alone is not satisfactory for use in such installations as a fire sprinkler system, for example. This is because, if the temperatures of the surroundings rise above the melting point of the sealing material, the fluid pressure in the piping installation might well disrupt one or more of the joints and cause a failure of the system.

It is the purpose of the present invention to provide a pipe joint which will not so fail under advanced temperature conditions, and which, incidentally, is more resistant to longitudinal disruption (pulling the pipe from the fitting) such as might be encountered when the installation is used for the conduction of fluid under exceptionally high pressures.

Broadly described, the present invention comprises providing, in the fitting or in the pipe as the case may be, a locking ring which is arranged in such manner as to permit unimpeded insertion of the pipe into the fitting, but which positively locks the pipe against withdrawal from the fitting, the binding action of the locking ring becoming more pronounced to hold the pipe in the fitting as the forces tending to remove the pipe from the fitting are increased.

One of the preferred forms of the invention is illustrated in Figures 1 through 4.

Figure 1:
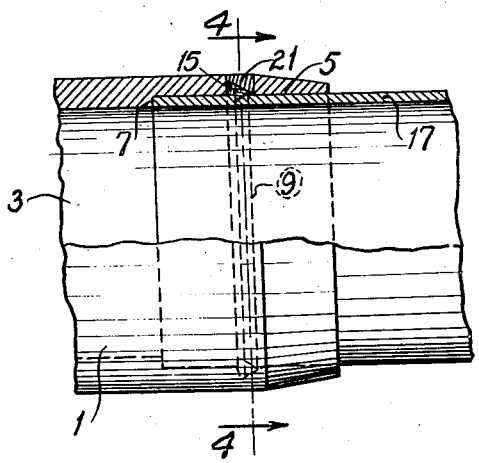

Referring now more particularly to Fig. 1, numeral 1 indicates a nozzle portion of a fitting. The fitting may comprise a coupling, an angle, a T, a cross, a cap, a reducer, a valve entrance, or any of the multitudinous other classes of fittings, it being immaterial to the present invention just which type of fitting is under consideration. The nozzle 1 is provided internally with a central bore 3 and a counterbore 5, the counterbore terminating in a shoulder 7.

Figure 2:
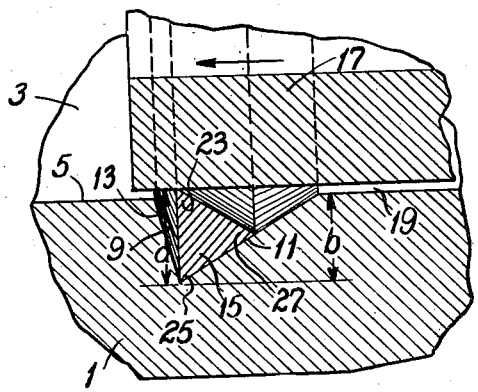
Fig. 2 is an enlarged section of a portion of the joint of Fig. 1, but in the course of assembly.

In the counterbore 5 there is provided an annular groove 9, which, in the present invention, is of triangular shape as shown more in detail in Figures 2 and 3. The face 11 of the groove 9 nearest the end of the nozzle 1 is arranged at a comparatively small angle to the counterbore 5. The angle of the other face 13 of the groove 9 is of little consequence, but it is shown as an angle considerably greater than that of the face 11 in the present embodiment.

In the groove 9 there is sprung a split ring 15, which, in the present embodiment, is of a substantially equilateral triangular cross section. The ring 15 is preferably formed of spring steel, or some similar material having a greater hardness than that of the pipe 17 which it is desired to insert. The pipe 17, as shown, has an external diameter slightly less than the internal diameter of the counterbore 5, providing a clearance indicated at numeral 19 in Fig. 2. The clearance 19, in accordance with the teachings of the said Hill patent, is desirably of such dimension as to induce capillary flow of a thin-liquid sealing material, such as melted solder, introduced therein.

The effective radial thickness of the ring 15 (as indicated by the index character $a$ in Fig. 2), is enough greater than the maximum effective radial depth of the groove 9 (indicated by index character $b$ in Fig. 2) that said ring 15 projects into the counter bore 5 a distance just sufficient to engage the side walls of the pipe 17 as it is inserted. In other words, the distance $a$ is substantially equal to the distance $b$ plus the clearance provided for between the counterbore 5 and fitting 17.

The nozzle 1 is provided with a sprue or sealing material inlet 21, which communicates with the groove 9 from the exterior of the fitting.

Assembly of the joint as thus constituted is effected in the following manner: With the ring 15 positioned in the groove 9, the pipe 17 is telescopingly introduced into the counterbore 5. As the pipe 17 moves to the left (in the manner shown in Fig. 2), it pushes the ring 15 into the deepest part of the groove 9, if said ring is not already there located. With the ring 15 thus positioned, the pipe may be introduced until it abuts the shoulder 7 without interference on the part of the ring 15. When, however, the direction of material of the pipe 17 is reversed, and it is attempted to withdraw the pipe from the fitting, as illustrated in Fig. 3, the upstanding sharp edge 23 of the ring 15 cuts or gouges into the material of the pipe 17. The ring 15 opposes withdrawal motion of the pipe 17 in two manners: First, if it is considered that there is no tendency for the ring 15 to turn, backwards motion slides the face 25 of the ring 15 opposite the edge 23 along the face 11, which, because of its slope, progressively forces the cutting edge 23 to gouge deeper into the pipe 17 and thus eventually reaches a point where further removal is impossible. Or, it may be considered that the pipe 17, in moving to the right, engages the point 23 of the ring 15 and tends to rotate the ring 15 on the edge 27 thereof. However, such rotation also causes the cutting edge 23 to gouge more deeply into the pipe 17 and eventually prevent further withdrawal. In practice, it is found that the action of the ring 15 is a combination of sliding and rotating described. With a very slight withdrawal of the pipe 17 to the right, the ring 15 will be found to have gouged deeply enough so that the pipe 17 is effectively locked or jammed in position and further withdrawal is impossible. The position of the ring 15 in such a gouged condition is, for example, equivalent to that shown in Fig. 3 where it will be seen that the cutting edge 23 has gouged an appreciable distance into the pipe 17.

Once the pipe 17 is thus locked in position, solder or other sealing material may be admitted through the sprue 21 in a liquid condition, such liquid solder then traveling about the pipe 17 through the open portion of the groove 9 and spreading out, by capillary attraction, into the clearance-space 19 between the pipe 17 and the counterbore 5. Solder is indicated as in position by numeral 29 in Fig. 3. In distributing the solder the groove 9 acts as a head or receiver from which the capillary attraction phenomena withdraws material. As soon as the sealing material becomes solid, it will be seen that it performs a sealing function, making the joint leak-proof (which it might not have been under the action of the locking ring 15 alone), and in addition constitutes keys in turn locking the locking ring 15 in position.

Thus constituted, a joint has been found to be considerably stronger than the material of which the pipe and/or fitting are formed.

If a finished joint made in accordance with Fig. 3 is subjected to longitudinal strain under such occasions that the sealing material 29 is melted, the locking ring 15 prevents disruption of the joint, and also serves as a sufficiently good barrier to prevent any great amount of leakage out of the joint. As an aid to prevention of leakage, it will be noted that the solder 29, although it may have melted, is still held in approximate position by the capillary attraction phenomena operating in the clearance-region 19.

The ring 15, for example, may be made of spring-steel, while the fitting 1 is bronze, and the pipe 17 is copper, for example. Thus the steel ring is capable of biting into or gouging the softer copper pipe 17 in such manner as to hold it firmly and positively locked together.

Figure 5:
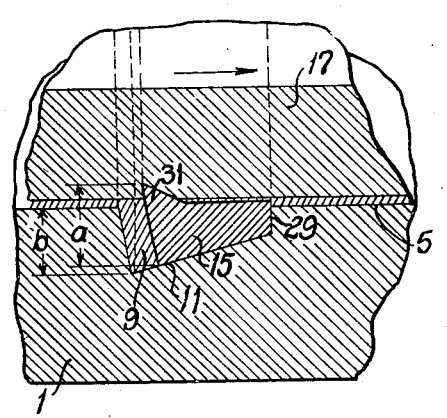
Figure 6:
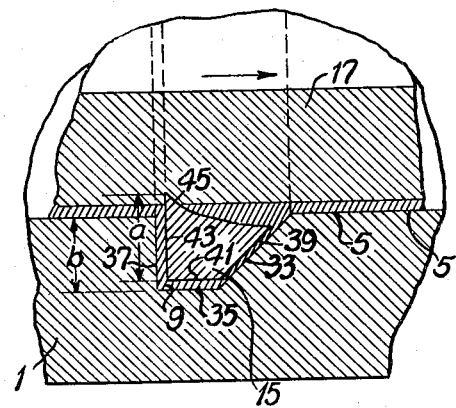

Figures 5 and 6 illustrate variations of the shape of the groove 9 and locking ring 15 shown in the earlier-described form of the invention. In Fig. 5, for example, the groove 9 is similar to the groove 9 of the first embodiment, with the exception that it has a flat shoulder or face 29. The locking ring has the general form of a rhomboid, but has an extended cutting edge 31, which performs the gouging of the pipe 17. The same relationship obtains between the distances $a$ and $b$ as in the first-described embodiment. The operation of this embodiment of the invention is quite similar to that of the first-described embodiment, with the exception that in this embodiment there is substantially no rotational tendency on the ring 15 as the pipe 17 is withdrawn, the locking action being entirely due to the sliding of the ring 15 on the face 11 of the groove 9.

In the Fig. 6 embodiment, the groove 9 is provided with a sloping face 33 at the entrance end of the counterbore 5, a cylindrical face 35 bottoming the groove, and a face 37 at right angles to the axis of the fitting. The ring 15 has in turn a sloping face 39 sliding on the face 33, and faces 41 and 43 which fit against the faces 35 and 37 of the groove 9 when the ring 19 is in its retracted, or non-obstructing position. A cutting edge 45 is likewise provided on the ring 15. The customary relation between the distances $a$ and $b$ are again maintained. In operation, the Fig. 6 embodiment is substantially identical to the Fig. 5 embodiment, but little rotational tendency being present upon the ring 15.

Figure 7:
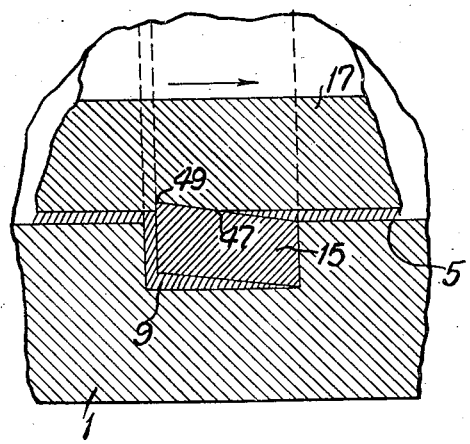

The embodiment illustrated in Fig. 7 varies in one particular from the previous embodiments, in the respect that the groove 9 is now rectangular. The ring 15 has a cross-sectional form of a rhombus, and is so sprung that it normally takes the position illustrated in Fig. 7, if not otherwise constrained. In assembling this embodiment of the invention, the pipe 17, in advancing to the left, engages and pushes aside the upper face 47 of the ring 15 against the resiliency of said ring. Upon movement of the pipe 17 to the right, in a withdrawing direction, however, the cutting edge 49 of the ring 15, under the springing tendency of said ring, gouges into the pipe 17 and locks said pipe against withdrawal, in the manner of the previous embodiments. To secure this effect, it is necessary that the spring tendency of the ring 15 is enough to normally position the cutting edge 49 in position to be intersected, and not to clear the pipe 17 as it is introduced into the fitting. The groove 9 is of sufficient size adequately to take care of the temporary deformation of the ring 15 as the pipe 17 is entered into the socket.

Figure 8:
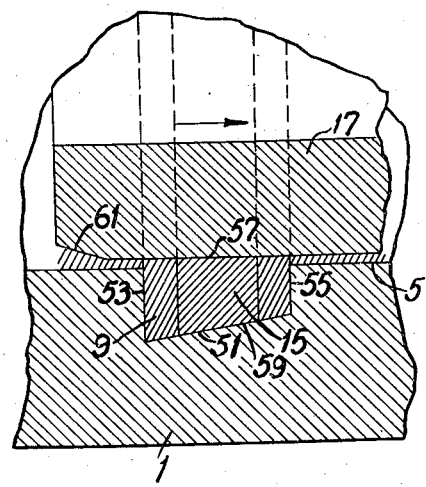

The embodiment illustrated in Fig. 8 differs from the previous embodiments in that the locking is effected against withdrawal of the pipe 17 without gouging or cutting into the pipe 17 itself. In this embodiment, the groove 9 has a sloping bottom surface 51, but vertical end surfaces 53 and 55. The shallower end 55 of the groove 9 is nearest the end of the fitting. The locking ring 15 has a rhombic shape, the inner surface 57 thereof being cylindrical, when the outer surface 59 thereof is provided preferably at the same slope as the surface 51 of the groove 9. The ring 15 in this embodiment is performed with such a resiliency or spring that, when the pipe 17 is forced into position, it clamps itself tightly about said pipe 17; in other words, the spring tendency of the ring 15 is to contract upon the pipe 17 rather than to expand into the groove 9. For this embodiment, it is desirable that the entering end of the pipe 17 be slightly tapered, as indicated at numeral 61, in order that said pipe, upon entering the fitting, will be capable of opening the ring 15 against its normal resilience to an extent sufficient to permit the pipe 17 to be bottomed against the shoulder 7 of the fitting. Movement of the pipe to the right, in this embodiment, is limited by the positive locking engagement of the faces 51 and 59 of the groove 9 and ring 15 respectively.

Figures 9 and 10 indicate an embodiment of the invention constructed in a manner somewhat similar to the embodiment of Fig. 8, with the difference that the single ring 15 of the Fig. 8 embodiment is replaced by a coil 63 of one or more turns of preferably spring wire of circular cross section. In general, one turn is sufficient, although for particularly effective locking action, a plurality of turns may be provided, as illustrated. The groove 9 in this embodiment comprises a vertical face 65 and a sloping face 67. The coil 63 is so arranged as to clamp itself around, or tighten upon the pipe 17 in distinction to expanding themselves into the groove 9. It is in this particular that a multi-turn coil offers advantages, inasmuch as it clamps on to the pipe in a manner much more positive than a single-turn coil, or open ring. The position of the coil 63 upon centering the pipe 17 into the socket is illustrated in Fig. 10, while the locking or wedging of the coil 63 when it is attempted to remove the pipe 17 is illustrated in Fig. 9, the latter forms showing the coil 63 in locking position.

In all of the embodiments thus far described, the groove has been described as positioned in the fitting, the pipe 1 being considered as initially smooth and undeformed. The invention also includes forming the groove in the pipe end 17, and leaving the counterbore 5 of the socket smooth, as illustrated in Figures 11 and 12. In this figure, the pipe end 17 is provided with a rectangular groove 69, which receives a locking ring 71 that is similar in construction and operation, for example, to the embodiment illustrated in Fig. 7. It will be understood that the groove 69 may be suitably shaped to receive the various shaped rings of all of the embodiments heretofore described, the one shown being by way of example only. In operation, this embodiment of the invention is identical to the preceding embodiments with the exception that the locking ring 71 goes into the surface of the counterbore 5 rather than into the surface of the pipe 17.

In the embodiment illustrated in Fig. 11, the customary sprue or port 21 is provided in the fitting 1, the unfilled portions of the groove 69 communicating with said sprue to form the distributing channel for the liquid sealing means. Fig. 12 shows an embodiment wherein the sprue 21 is eliminated, and is replaced by a longitudinal channel 73 provided in the pipe 17, the channel 73 leading from the groove 69 outwardly to a point beyond the end of the fitting 1 in such manner that an opening 75 is left for the introduction of the solder. In this embodiment, when the soldering or sealing of the joint is commenced, the sealing material is fed in at the opening 75, whence it travels by channel 73 to the groove 69 to be distributed about the fitting and drawn by capillary attraction into the positions hereinbefore described.

One advantage of the present invention, incident to all of the embodiments hereinbefore described, is that a structionally strong sealing material is not required. This is because the joint is made adequately strong by the locking ring, and the only function of the sealing material is to seal off minute leaks and the like. Accordingly, in the present invention, sealing material of the type of asphalt, or tar, or the like, may satisfactorily be used, whereas, in the Hill patent type of joint, the use of such sealing materials would possibly give rise to a weak, albeit sealed joint.

Or, if minute leakage is not important (such as would be the case in the event that the piping installation were designed as a housing for electrical conductors or the like) the use of sealing material may be dispensed with altogether.

It will be seen that a primary feature of the invention, running throughout the several embodiments, is that either the pipe or the fitting need have no appreciable pre-deformation (in other words, no cooperating recesses or the like are needed in both the pipe and fitting), and that the locking rings of all of the embodiments are so arranged that their locking tendency increases as the force tending to withdraw the pipe from the fitting increases. This last function is provided, in the preferred embodiments of the invention, by means of locking rings which cut or gouge into the material of the pipe, while in the latter embodiments this function is provided by a sloping surface against which the locking ring is more tightly compressed as withdrawal of the pipe is attempted.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A joint comprising a pair of telescoping members, one of said members having an annular groove therein in the region of telescoping engagement with the other member, and an opening communicating said groove with the exterior of said member, said groove having a shallower portion and a deeper portion, and a locking ring positioned within said groove, said locking ring being so shaped that, as the said members are telescoped together, it is forced into the deeper portion of said groove to permit free entering motion of the entering member, but when said members are moved in the direction of separation, it moves into the shallower portion of said groove positively to lock said members against separation, said groove also being adapted to distribute sealing material introduced through said opening throughout the said region of telescoping engagement.

2. A joint comprising a pair of telescoping members, one of said members having an annular groove therein in the region of telscoping engagement with the other member, and an opening communicating said groove with the exterior of said member, and a locking ring positioned in said groove, said locking ring having a cutting edge, said locking ring being so shaped that it permits entering motion of one member into the other, but positively prevents withdrawal of one member from the other by gouging the said cutting edge of the locking ring into the material of the member not having the groove, said groove also being adapted to distribute sealing material introduced through said opening throughout the said region of telescoping engagement.

3. A joint comprising a pair of telescoping members, one of said members having an annular groove therein in the region of telescoping engagement with the other member, and an opening communicating said groove with the exterior of said member said groove having a shallower portion and a deeper portion, and a locking ring positioned within said groove, said locking ring having a cutting edge, said locking ring being so shaped that, as the said members are telescoped together, it is forced into the deeper portion of said groove to permit free entering motion of the entering member, but when the said members are moved in the direction of separation, said ring is moved into the shallower part of said groove to position said cutting edge to gouge into the material of the member not having the groove, thereby positively to lock said members against separation, said groove also being adapted to distribute sealing material introduced through said opening throughout the said region of telescoping engagement.

4. A joint as set forth in claim 3, in which the groove is of triangular cross-section, and the locking ring is likewise of triangular cross-section, one face of the ring engaging and sliding upon one face of the groove, and the edge of the ring opposite the face engaging the groove constituting the said cutting edge.

5. A joint as set forth in claim 3, in which the greatest effective radial depth of the groove is less than the greatest effective radial thickness of the ring by an amount substantially equal to the clearance provided for between said members.

6. A joint as set forth in claim 3, in which the members comprise a fitting having a socket, and an initially undeformed pipe end entering said socket, the said groove being provided in the fitting member.

7. A joint as set forth in claim 2 in which the groove is of rectangular cross-section, and the locking ring is of rhombic cross-section, the rhombic shape of the ring forcing one edge thereof into position to act as the said cutting edge.

8. A joint as set forth in claim 3 in which the groove has a sloping face providing said shallower and deeper portions, said sloping face being at a relatively slight angle to the axis of the joint.

9. A joint as set forth in claim 1 in which the locking ring comprises a split ring of resilient material having a tendency to clamp itself upon the member not having the groove, said ring, when clamped upon said member, comprising a barrier radially too thick to pass the shallower portion of said groove, whereby said members are locked together.

OSCAR B. MUELLER.
HAROLD K. RADER.
WILFRED H. PROCTOR.
PHILIP L. IRVING.